(12) United States Patent
Simendinger, III

(10) Patent No.: US 7,163,750 B2
(45) Date of Patent: Jan. 16, 2007

(54) THERMAL BARRIER COMPOSITION

(75) Inventor: William H. Simendinger, III, Raleigh, NC (US)

(73) Assignee: Microphase Coatings, Inc., Garner, NC (US)

( * ) Notice: Subject to any disclaimer, the term of this patent is extended or adjusted under 35 U.S.C. 154(b) by 247 days.

(21) Appl. No.: 10/960,666

(22) Filed: Oct. 7, 2004

(65) Prior Publication Data
US 2005/0106381 A1    May 19, 2005

Related U.S. Application Data

(63) Continuation-in-part of application No. 10/814,213, filed on Mar. 31, 2004, now abandoned.

(60) Provisional application No. 60/461,800, filed on Apr. 10, 2003.

(51) Int. Cl.
B32B 9/04 (2006.01)

(52) U.S. Cl. ............ 428/447; 428/450; 524/430; 524/447; 524/449; 524/493; 524/588; 528/10; 523/219

(58) Field of Classification Search ............ None
See application file for complete search history.

(56) References Cited

U.S. PATENT DOCUMENTS

| | | | |
|---|---|---|---|
| 3,933,712 A * | 1/1976 | Vanaglash, Jr. ......... 523/219 |
| 4,000,108 A * | 12/1976 | Yokokawa et al. ...... 523/219 |
| 4,405,679 A | 9/1983 | Fujioka et al. |
| 4,602,959 A | 7/1986 | Kurita et al. |
| 4,725,501 A | 2/1988 | Rukavina et al. |
| 4,753,827 A | 6/1988 | Yoldas et al. |
| 4,814,017 A | 3/1989 | Yoldas et al. |
| 4,816,288 A | 3/1989 | Rukavina et al. |
| 4,990,547 A | 2/1991 | Stovicek |
| 5,068,277 A | 11/1991 | Vukov et al. |
| 5,096,488 A | 3/1992 | Stovicek |
| 5,173,110 A | 12/1992 | Stovicek |
| 5,218,059 A | 6/1993 | Kishihara et al. |
| 5,232,996 A | 8/1993 | Shah et al. |
| 5,298,060 A | 3/1994 | Harakal et al. |
| 5,331,074 A | 7/1994 | Slater et al. |
| 5,433,941 A | 7/1995 | Patel |
| 5,593,732 A | 1/1997 | Griffith |
| 5,663,215 A | 9/1997 | Milligan |
| 5,688,851 A | 11/1997 | Kress |
| 5,939,478 A | 8/1999 | Beck et al. |
| 5,942,583 A | 8/1999 | Azechi |
| 5,958,116 A | 9/1999 | Kishihara et al. |
| 6,013,724 A | 1/2000 | Mizutani et al. |
| 6,045,869 A | 4/2000 | Gesser et al. |
| 6,313,193 B1 | 11/2001 | Simendinger, III |
| 6,476,095 B1 | 11/2002 | Simendinger, III |
| 6,559,201 B1 | 5/2003 | Simendinger, III |
| 6,933,334 B1 * | 8/2005 | Cosby et al. ........... 524/16 |
| 2004/0262739 A1 * | 12/2004 | Sethumadhavan et al. .. 257/702 |

FOREIGN PATENT DOCUMENTS

| | | |
|---|---|---|
| EP | 0563939 A1 | 10/1993 |
| EP | 0664322 A1 | 7/1995 |
| EP | 0851009 A2 | 7/1998 |
| JP | 62-277475 | 12/1987 |
| JP | 2000319582 | 11/2000 |
| WO | WO 01/02506 A1 | 1/2001 |

OTHER PUBLICATIONS

U.S. Appl. No. 11/149,886, filed Jun. 10, 2005, Simendinger et al.
U.S. Appl. No. 11/324,687, filed Jan. 3, 2006, Simendinger et al.
U.S. Appl. No. 11/370,683, filed Mar. 8, 2006, Miller.

* cited by examiner

*Primary Examiner*—Marc S. Zimmer
(74) *Attorney, Agent, or Firm*—Myers Bigel Sibley & Sajovec, PA

(57) ABSTRACT

The thermal barrier composition of the present invention provides polymethylsilsesquioxane dissolved in a crosslinking agent, and a filler and/or hollow glass microspheres.

7 Claims, No Drawings

THERMAL BARRIER COMPOSITION

RELATED APPLICATION

This application claims priority to Provisional Application No. 60/461,800 filed Apr. 10, 2003 and is a continuation-in-part of patent application Ser. No. 10/814,213 filed Mar. 31, 2004, now abandoned the disclosures of which are hereby incorporated by reference in their entirety.

FIELD AND BACKGROUND OF THE INVENTION

The present invention relates to a thermal barrier composition for use on a variety of substrates that are exposed to high temperatures. Exemplary substrates include pipelines, engine parts including jet engine components, water conduits including tubes in power plants, reactor vessels and exhaust manifolds.

Substrates, particularly metal substrates, can be subjected to high temperatures causing fatigue, cracking, distortion and the like of the substrate. For example, components of a jet engine or the surrounding parts of the jet can be exposed to temperatures in excess of 1800° F. In such a situation, it is readily apparent that fatiguing or cracking can lead to catastrophic failure. Similarly, piping used in various manufacturing facilities can be subjected to temperatures in excess of 400° F. caused by the liquid or gas passing through the pipe. In such an application, it is preferred that the coating not only provide a thermal barrier but also provide anti-corrosion properties and be abrasion resistant.

SUMMARY OF THE INVENTION

The thermal barrier composition of the present invention comprises polymethylsilsequioxane dissolved in a crosslinking agent, preferably titanium isopropoxide, hollow glass microspheres, and optionally a filler.

In another embodiment, the present invention provides a composition that is corrosion resistant and is able to be a pin hole free coating. The composition comprises polymethylsilsequioxane dissolved in a crosslinking agent, preferably titanium isopropoxide, and a mica filler.

DETAILED DESCRIPTION OF THE INVENTION

As briefly discussed above, the present invention provides a thermal barrier composition comprising polymethylsilsequioxane dissolved in a crosslinking agent and hollow glass microspheres and optionally a filler. Suitable crosslinking agents include titanium isopropoxide, titanium ethyl hexoxide, titanium methoxide, titanium ethoxide, titanium butoxide, titanium diisopropoxide (bis, 2,4 pentadionate), titanium diisopropoxide bis (ethyl acetoacetate), and titanium diisopropoxide (bis tetremethyl heptandionate). Preferably thin walled glass microspheres are used.

In another embodiment, the present invention provides a corrosion resistant composition comprising polymethylsilsequioxane dissolved in a crosslinking agent, (e.g., titanium isopropoxide), and a mica filler.

The thermal barrier composition of the present invention can be coated onto a wide variety of substrates including steel, stainless steel, aluminum, titanium, magnesium and zinc. The coating can withstand continuous use temperatures of 1800° F. or higher. Moreover, the composition is resistant to corrosive agents such as nitrogen and sulfur compounds.

The polymethylsilsesquioxane ("POSS") is dissolved in a crosslinking agent preferably titanium isopropoxide. By dissolving in titanium propoxide, up to about 50 percent of the POSS can be dissolved as compared to about 10 percent or less solubility in solvents.

The thermal barrier composition may include a solvent such as isopropanol, ethanol, methanol and butanol. The thermal barrier composition may also optionally include fillers such as, without limitation, glass fibers, fumed silica, mica, kaolin, bentonite, talc, zinc oxides, iron oxides and pigments or other fillers, as will be readily apparent to those skilled in the art. Typically the volume percent of glass microspheres is from about 30 percent to about 80 percent. Anti-corrosion agents such as zinc phosphates and zinc salts can also be added.

In operation, the compositions of the present invention can be applied to a substrate by roll-coating, brush, spray coating dipping and the like.

The following specific examples are provided to afford a better understanding of the present invention to those skilled in the art. It is to be understood that these examples are intended to be illustrative only and is not intended to limit the invention in any way.

EXAMPLES

Example 1

1. Prepare polymethylsilsequioxane (POSS)/Titanium isopropoxide (TIPO) solution by mixing 42 weight percent POSS with 58 weight percent TIPO. Heat for six (6) hours under pressure at 140° C.
2. Mix the following ingredients at room temperature and pressure:

| | |
|---|---|
| POSS/TIPO (42/58) solution | 29.76 wt % |
| Hollow Glass Microspheres 5–100 micron | 16.67 |
| Isopropanol | 52.08 |
| Fumed silica | 1.49 |

Application: Apply the coating in one continuous film build to the desired thickness. Insulation value is 100° C./millimeter.

Example 2

1. Prepare polymethylsilsequioxane/Titanium isopropoxide solution by mixing 42 weight percent POSS with 58 weight percent TIPO. Heat for six (6) hours under pressure at 140° C.
2. Mix the following ingredients at room temperature and pressure:

| | |
|---|---|
| POSS/TIPO (42/58) solution | 10.53 wt % |
| Custer Mica A-325 | 52.00 |
| Isopropanol | 37.47 |

Application: Spray one layer of the coating to a thickness of 5–10 mils. Allow to tack over and spray a second layer of 5–10 mils. Two layers must be used to achieve a pin hole free coating.

The invention has been described with respect to the preferred embodiments set forth above. It should be appreciated however that these embodiments are for the purposes of illustrating the invention, and are not intended to limit the scope of the invention as defined by the claims.

That which is claimed is:

1. A thermal barrier coating composition
   (a) polymethylsilsesquioxane dissolved in a crosslinking agent; and
   (b) hollow glass microspheres.

2. The thermal barrier coating composition according to claim 1, wherein the crosslinking agent is titanium isopropoxide.

3. The thermal barrier coating compositiong according to claim 1, further comprising a filler selected from the group consisting of fumed silica, mica, kaolin, bentonite, talc, zinc oxides, iron oxides and pigments.

4. A substrate coated with a thermal barrier composition comprising polymethylsilsesquioxane dissolved in a crosslinking agent and hollow glass microspheres.

5. The substrate according to claim 4, wherein the substrate is selected from the group consisting of steel, stainless steel, titanium, aluminum, magnesium and zinc.

6. The substrate according to claim 4, wherein the crosslinking agent is titanium isopropoxide.

7. The substrate according to claim 4, wherein the composition includes a filler selected from the group consisting of fumed silica, mica, kaolin, bentonite, talc, zinc oxides, iron oxides, and pigments.

* * * * *